US012601671B2

(12) United States Patent　　　　(10) Patent No.:　US 12,601,671 B2
Xiong et al.　　　　　　　　　　　　　(45) Date of Patent:　　Apr. 14, 2026

(54) PARTICLE SIZE STATISTICAL METHOD OF GRANULAR MINERALS OF SHALE

(71) Applicant: Southwest Petroleum University, Chengdu City (CN)

(72) Inventors: Min Xiong, Chengdu City (CN); Lei Chen, Chengdu City (CN); Xiucheng Tan, Chengdu City (CN); Yubing Ji, Chengdu City (CN); Qingsong Cheng, Chengdu City (CN)

(73) Assignee: Southwest Petroleum University, Chengdu (CN)

( * ) Notice: Subject to any disclaimer, the term of this patent is extended or adjusted under 35 U.S.C. 154(b) by 209 days.

(21) Appl. No.: 18/494,919

(22) Filed: Oct. 26, 2023

(65) Prior Publication Data

US 2024/0077401 A1　　Mar. 7, 2024

(30) Foreign Application Priority Data

Oct. 27, 2022　(CN) .......................... 202211325621.8

(51) Int. Cl.
G01N 15/0227　　(2024.01)
G06T 5/40　　(2006.01)
(Continued)

(52) U.S. Cl.
CPC ........... G01N 15/0227 (2013.01); G06T 5/40 (2013.01); G06T 5/50 (2013.01); G06T 7/13 (2017.01);
(Continued)

(58) Field of Classification Search
CPC ....... G01N 15/0227; G01N 2015/0061; G01N 2015/1493; G01N 15/1433; G06T 5/40;
(Continued)

(56) References Cited

U.S. PATENT DOCUMENTS

2022/0397697 A1 * 12/2022 Andrew ............. G06V 30/2504

FOREIGN PATENT DOCUMENTS

CN　　109444015 A　*　3/2019 ........... G06T 7/0004
CN　　111272617 A　*　6/2020 ......... G01N 15/0227
(Continued)

*Primary Examiner* — Michael P LaPage

(57) ABSTRACT

The present disclosure provides a particle size statistical method of granular minerals of shale, comprising: collecting shale samples; cutting the collected samples into the size of 1 cm×1 cm×1 cm; performing argon ion polishing; magnifying the samples by the field emission scanning electron microscopy, collecting 500-1000 images; using Adobe Photoshop to seamlessly splice the collected images; using ImageJ in combination with EDS energy spectrum to determine types of mineral particles, performing background subtraction, and setting a reasonable grayscale threshold to classify the particle minerals; performing binary processing on the images of selected mineral particle types; identifying edges of granular minerals, and using a Analyze Particles command to statistically analyze and measure particle sizes, and drawing a particle size distribution histogram. The method can perform precise measurement and statistics on the particle sizes of shale particle minerals, and can perform full-scale statistical analysis on the distribution of different mineral particle sizes in the shale.

1 Claim, 6 Drawing Sheets

(51) Int. Cl.

| | | |
|---|---|---|
| *G06T 5/50* | (2006.01) | |
| *G06T 7/13* | (2017.01) | |
| *G06T 7/136* | (2017.01) | |
| *G06T 7/174* | (2017.01) | |
| *G01N 15/00* | (2006.01) | |

(52) U.S. Cl.
CPC .............. *G06T 7/136* (2017.01); *G06T 7/174* (2017.01); *G01N 2015/0061* (2013.01); *G06T 2207/10061* (2013.01)

(58) Field of Classification Search
CPC ..... G06T 5/50; G06T 7/11; G06T 7/13; G06T 7/136; G06T 7/174; G06T 2207/10061; G06T 2207/20221
See application file for complete search history.

(56) References Cited

FOREIGN PATENT DOCUMENTS

| | | | | | |
|---|---|---|---|---|---|
| CN | 113640184 A | * | 11/2021 | ............... | G01N 1/32 |
| CN | 115046873 A | * | 9/2022 | ............. | G01N 1/286 |
| CN | 115165681 A | * | 10/2022 | ........... | G01N 15/088 |

* cited by examiner

PARTICLE SIZE STATISTICAL METHOD OF GRANULAR MINERALS OF SHALE

CROSS-REFERENCE TO RELATED APPLICATION

This application claims priority to Chinese Patent Application No. 202211325621.8, filed on Oct. 27, 2022 before the China National Intellectual Property Administration, the disclosure of which is incorporated herein by reference in entirety.

TECHNICAL FIELD

The present disclosure relates to the field of mineral classification, and in particular to a particle size statistical method of granular minerals of shale.

BACKGROUND

A patent application "A method for measuring distribution characteristics of different mineral particle sizes in a bulk rock sample" (2020, Chinese patent application number CN202010160600.X) provides a method of obtaining three parameters representing particle size characteristics, including particle size frequency distribution, cumulative frequency distribution, and cumulative passing frequency, of different mineral particle sizes of a rock, including: scanning the sample surface to obtain a backscattered image; measuring the mineral particles (mineral A and mineral B) on the surface of a bulk sample according to gray values of the backscattered image of the sample, respectively; statistically integrating the obtained measured results to obtain the corresponding parameters. It effectively improves the detection efficiency of mineral occurrence particle size characteristics, and the whole process is simple, fast, safe and economical.

The technical solutions in the Chinese patent application CN202010160600.X focus on measuring and analyzing the particle size characteristic parameters of particle minerals in a bulk rock, but do not involve the characterization of particle size and spatial distribution of shale. It simply divides the granular minerals in a massive rock into two categories: A and B, based on the extreme endpoints (0-x, 255-x) of the gray values in the backscattered image as a basis, to characterize the particle size characteristics of the rock sample. It does not involve the processing method in case where it contains multiple minerals. However, in practice, the composition of granular minerals in a rock sample is complex, so the accuracy of this technique is relatively low.

SUMMARY

The purpose of the present disclosure is to solve the above-mentioned defects in the prior art and provide a particle size statistical method of granular minerals of shale.

Shale is a fine-grained sediment with different types of particle minerals and an overall small particle size, it is difficult to accurately measure them by conventional particle size measuring methods. Therefore, how to accurately characterize the particle size of shale is currently a difficulty. One of the keys of characterizing the particle size characteristics of shale minerals is to digitally characterize the particle sizes in the micron-nano scale range in the shale. This method is simple and easy to use, and can be quantitatively operated. It only requires argon ion polishing of the sample, observation with a scanning electron microscope, and then usage of ImageJ for image processing and data statistics, the cost time is short and it can analyze a variety of mineral particle sizes in the shale. The method of the present disclosure can perform precise measurement and statistics on the particle sizes of shale particle minerals, and can perform full-scale statistical analysis on the distribution of different mineral particle sizes in the shale.

The present disclosure adopts the following technical solutions:

A particle size statistical method of granular minerals of shale, comprising:

step 1: collecting shale samples from cores or outcrops;

step 2: cutting the collected samples into the size of 1 cm×1 cm×1 cm;

step 3: performing argon ion polishing on the cut samples, then placing the samples under a field emission scanning electron microscopy for observation;

step 4: magnifying the samples by the field emission scanning electron microscopy to an appropriate magnification until mineral particles are clear, then observing the samples. Collecting 500-1000 images at the same scale, taking photos and saving photos of each sample;

step 5: using Adobe Photoshop image processing software to seamlessly splice the collected images, splicing adjacent images into one image, completing image splicing of multiple areas in sequence, and finally splicing all areas of the sample into one complete picture;

step 6: using ImageJ image analysis software in combination with EDS energy spectrum to determine types of mineral particles in the shale, performing background subtraction based on grayscale distribution of the images from the scanning electron microscope, and setting a reasonable grayscale threshold to classify the particle minerals in the shale (for example, feldspar, quartz, carbonate rock mineral, etc.);

step 7: setting reference values according to actual needs, and performing binary processing on the images of selected mineral particle types in sequence, so that the images become binary gray images with two gray levels with only black highlighted rock particles on a white background;

step 8: marking the mineral particle types to be measured in sequence, then identifying edges of granular minerals through automatic scanning and manual tracking, and using a Analyze Particles command to statistically analyze and measure particle sizes of minerals in a target area, and finally realizing extraction and calculation of particle sizes of minerals in a μm-nm scale range in shale images, and drawing a particle size distribution histogram of granular minerals.

Beneficial Effects of the Present Disclosure

The present disclosure can simply and quickly perform statistical analysis on different mineral particle sizes at the micron-nano scale in the shale, has good indicative significance for the depositional environment of shale, and can be of assistance in seeking for a favorable target of high-quality shale reservoirs in shale gas exploration. It will facilitate breakthroughs in shale gas exploration, and provide useful help in achieving China's "3060" dual-carbon goals.

BRIEF DESCRIPTION OF THE DRAWINGS

In order to more clearly illustrate the technical solutions of the embodiments of the present disclosure, the drawings needed for the description of the embodiments will be briefly introduced below. It should be understood that the following drawings only show certain embodiments of the present disclosure, therefore they should not be regarded as limiting the scope of the present disclosure. For those of ordinary skill in the art, other relevant drawings may be obtained based on these drawings without creative efforts.

Figure 5:
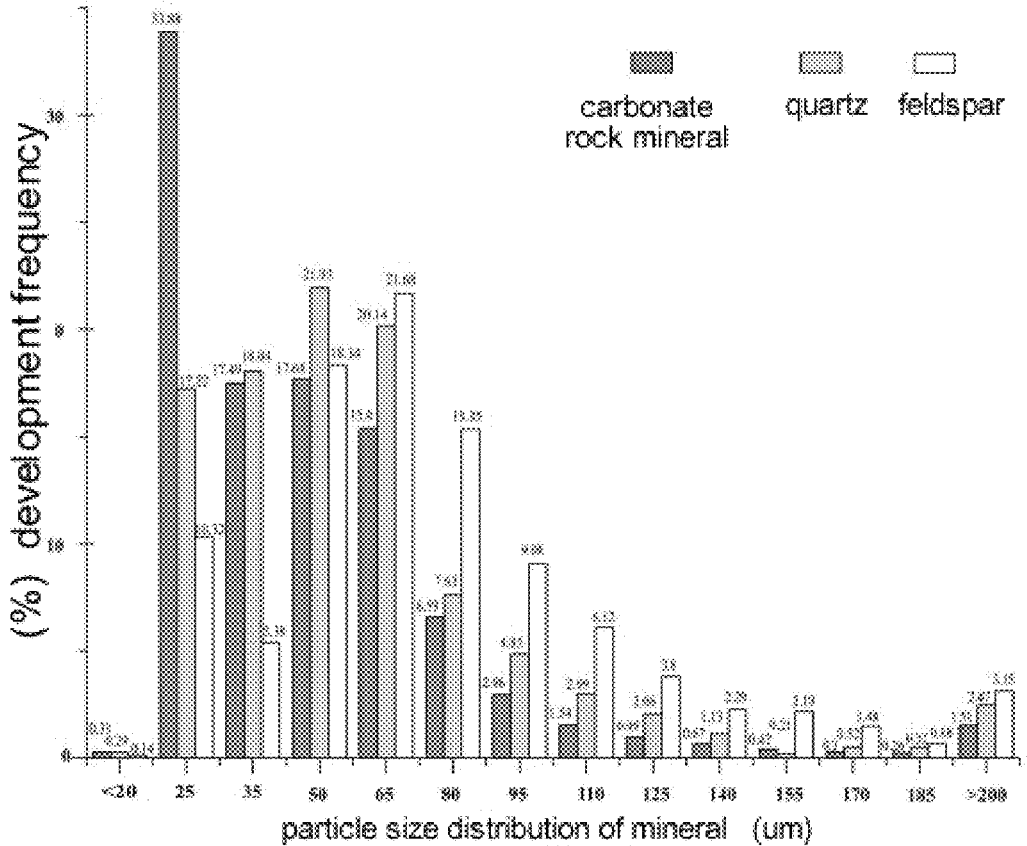
Figure 6:
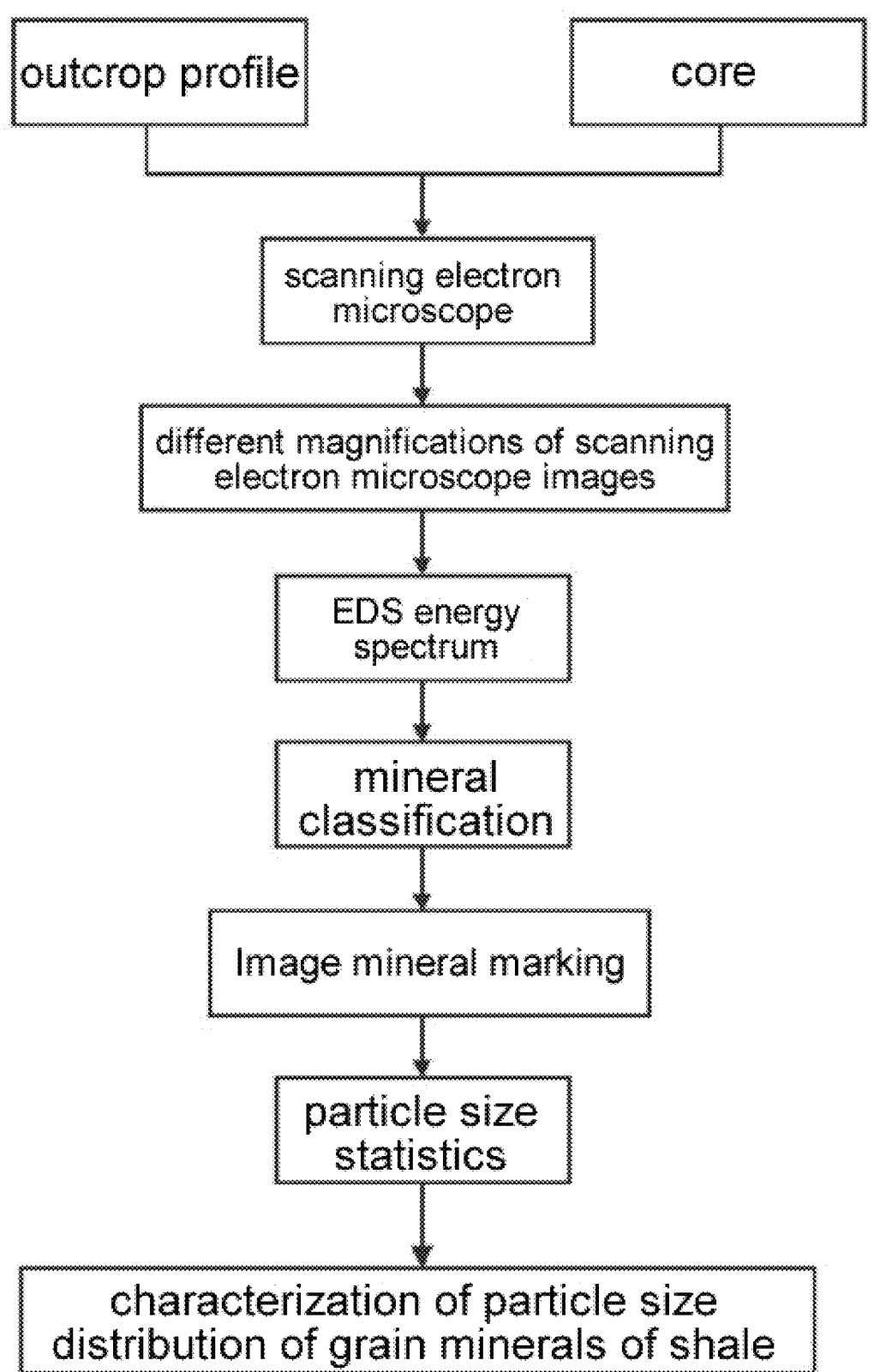

Where black represents quartz, white represents carbonate rock minerals, and gray represents feldspar, the determined mineral particle types may be increased or decreased according to actual needs;

FIG. 5 is a particle size distribution view of mineral particles according to an embodiment of the present disclosure;

FIG. 6 is a flow chart of the method according to an embodiment of the present disclosure.

DETAILED DESCRIPTION OF EMBODIMENTS

In order to make the purpose, technical solutions and advantages of the present disclosure clearer, the technical solutions in the present disclosure will be described clearly and completely below. Obviously, the described embodiments are only a part of the embodiments of the present disclosure, rather than all the embodiments. All other embodiments obtained by those of ordinary skill in the art based on the embodiments of the present disclosure without creative efforts fall within the scope of protection of the present disclosure.

As shown in FIG. 6, the particle size statistical method of granular minerals of shale according to the present disclosure includes the following steps:

step 1: collecting shale samples from cores or outcrops;

step 2: cutting the collected samples into 1 cm×1 cm×1 cm of particles;

step 3: performing argon ion polishing on the cut samples, then placing the samples under a field emission scanning electron microscopy for observation;

step 4: magnifying the samples by the field emission scanning electron microscopy to an appropriate magnification until mineral particles are clear, then observing the samples, collecting 500-1000 images at the same scale, taking photos and saving photos of each sample;

step 5: using Adobe Photoshop image processing software to seamlessly splice the collected images, splicing adjacent images into one image, completing image splicing of multiple areas in sequence, and finally splicing all areas of the sample into one complete picture;

step 6: using ImageJ image analysis software in combination with EDS energy spectrum to determine types of mineral particles in the shale, performing background subtraction based on grayscale distribution of the images from the scanning electron microscope, and setting a reasonable grayscale threshold to classify the particle minerals in the shale (for example, feldspar, quartz, carbonate rock mineral, etc.);

step 7: setting reference values according to actual needs, and performing binary processing on the images of selected mineral particle types in sequence, so that the images become binary gray images with two gray levels with only black highlighted rock particles on a white background;

step 8: marking the mineral particle types to be measured in sequence, then identifying edges of granular minerals through automatic scanning and manual tracking, and using a Analyze Particles command to statistically analyze and measure particle sizes of minerals in a target area, and finally realizing extraction and calculation of particle sizes of minerals in a μm-nm scale range in shale images, and drawing a particle size distribution histogram of granular minerals.

Embodiment

This embodiment provides a particle size statistical method of granular minerals of the Longmaxi Formation marine shale in Changning area. This method is used to determine the particle sizes of various types of fine-grained sedimentary grain (particle) minerals in the Longmaxi Formation shale, and finally obtain the particle size distribution histogram of different minerals, and then guide the research of depositional environment and hydrodynamic change of the Longmaxi Formation marine shale in Changning area.

Figure 1:
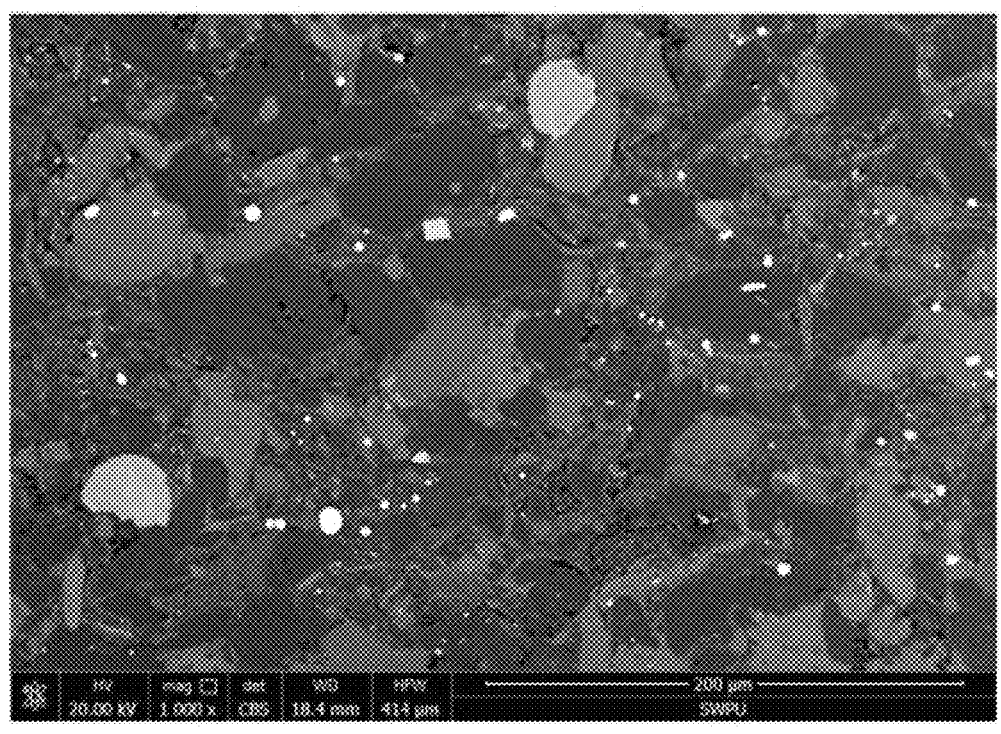
FIG. 1 is a collected picture of the shale under a field emission scanning electron microscopy at 1000× magnification according to an embodiment of the present disclosure.
Figure 2:
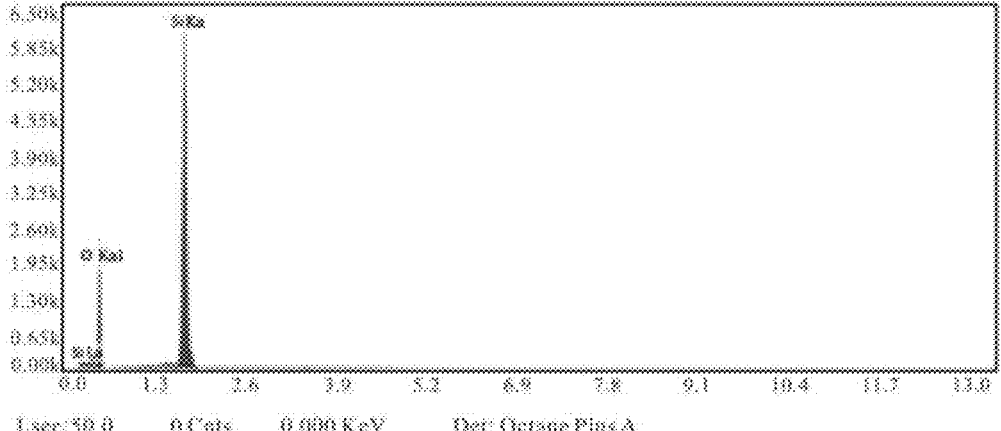
FIG. 2 is an Energy-Dispersive Spectroscopy (EDS) energy spectrum for marking shale particle minerals according to an embodiment of the present disclosure.

Referring to FIG. 1, together with FIGS. 2 to 6, this embodiment provides a particle size statistical method of granular minerals of shale. This method is used to determine the particle sizes of specific particle minerals, and finally obtain a particle size distribution histogram of different mineral particles, to guide the study of shale depositional environment and hydrodynamic change.

Figure 3:
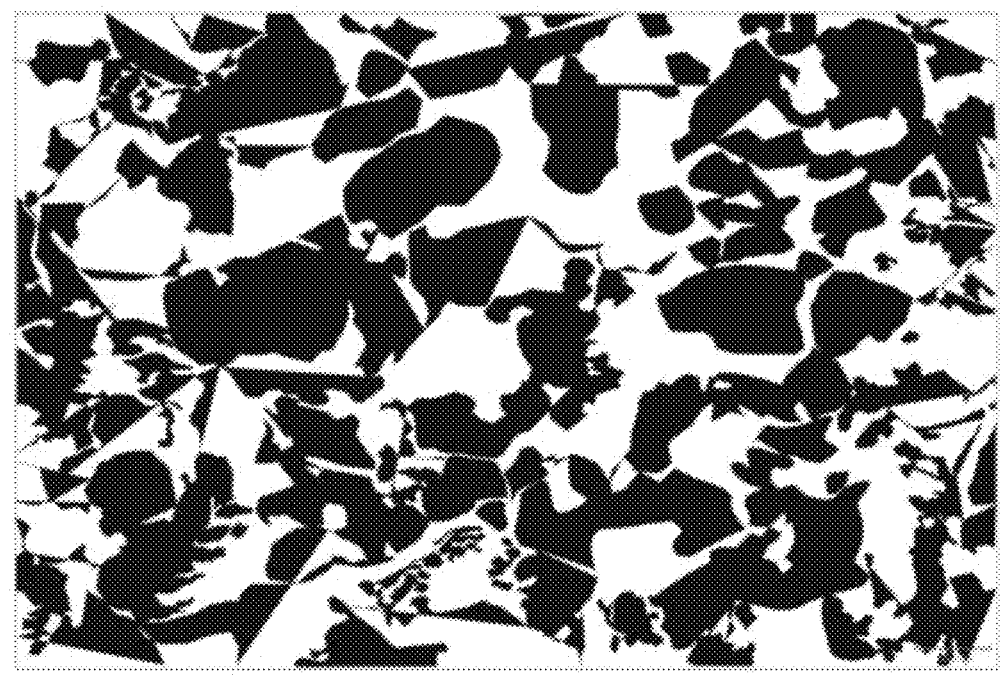
FIG. 3 is a view showing the image results of binary grayscale processing of the same mineral according to an embodiment of the present disclosure.
Figure 4:
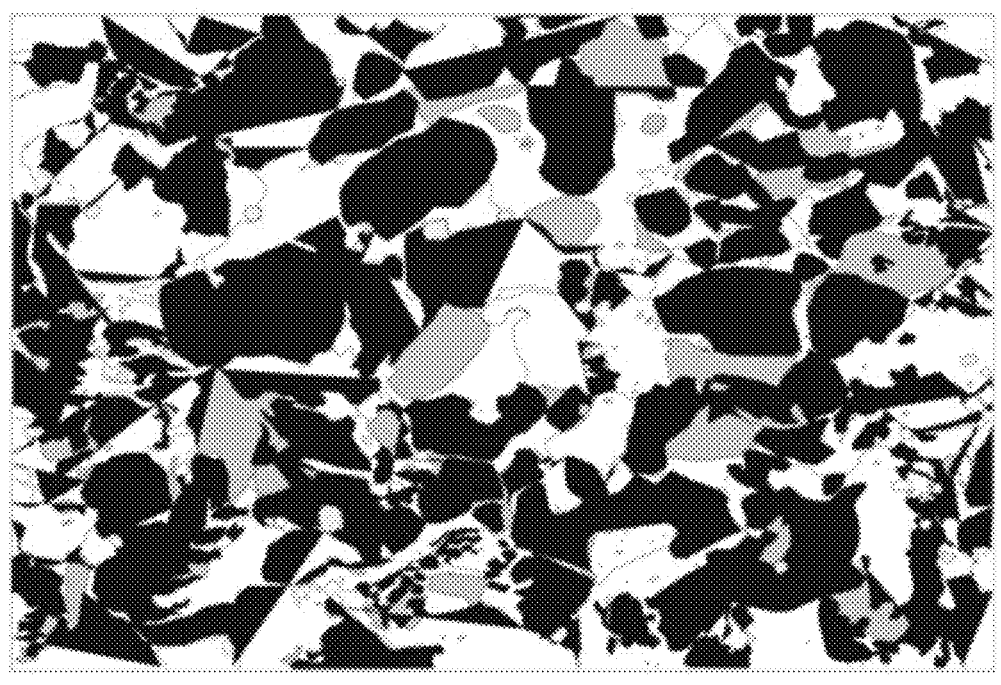
FIG. 4 is a picture of the determined type of shale particle mineral according to an embodiment of the present disclosure.

Referring to FIG. 1, together with FIGS. 2 to 6, the particle size statistical method of granular minerals of shale includes the following specific steps:

a: Collect shale samples from cores and outcrop profiles in different depositional environments in the Changning area. The selected samples should be representative and must preserve well-preserved sedimentary structures or have certain indicative significance for the depositional environment. Observe their macroscopic characteristics, including petrological characteristics, sedimentary characteristics, etc. All the collected samples are cut (1 cm×1 cm×1 cm of particles) and then processed by argon ion polishing and placed under a field emission scanning electron microscopy for observation;

b: Magnify the samples by the field emission scanning electron microscopy to an appropriate magnification until all shale mineral particles are clear for observation;

c: Collect 500-1000 images at the same scale, take photos and save them;

d: Use an image processing software to seamlessly splice all images collected from the same sample, complete image splicing of multiple areas in sequence, and finally splice all areas of the same sample into a complete picture (as shown in FIG. 1), and complete microscopic images of all the sample in sequence;

e: Mark a type of particle minerals (FIG. 1), use EDS energy spectrum to determine the type of mineral particles in the shale that needs to be marked (FIG. 2), first determine microscopic petrological characteristics of the same type of particle minerals, complete the characterization of the microscopic petrological characteristics of all mineral particle types in sequence according to actual needs;

f: Use ImageJ image analysis software to perform background subtraction on the grayscale distribution of the type of shale mineral particles specifically determined based on the EDS energy spectrum in the images from the scanning electron microscope, thus achieving the marking of single mineral type (FIG. 3);

g: According to the principle of grayscale segmentation, based on the extreme endpoints (0-x, 255-x) of grayscale values, adjust the distribution range of grayscale values within the range included by the extreme endpoints, find the most reasonable grayscale threshold and set it, until the single particle mineral type that needs to be marked in the Longmaxi Formation shale is fully characterized. The feature of full characterization is that the image changes to a binary grayscale image with two gray levels with only black highlighted rock particles on a white background. Based on this, the classification of granular minerals in the shale (for example, feldspar, quartz, carbonate mineral, etc.) is finally achieved (FIG. 4);

h: Set reference values according to the scale in the images from the field emission scanning electron microscopy, repeat the steps f and g, and perform binary processing on the images of the selected mineral particle type in sequence, and identify the edges of the granular minerals through automatic scanning and manual tracking, use the Analyze Particles command to statistically analyze and measure the particle sizes of minerals in a target area, obtain the distribution data of particle sizes of each mineral in sequence, and finally obtain the distribution data of particle sizes of all types of minerals;

i: Based on the statistical data results, realize extraction and calculation of particle sizes of minerals in a μm-nm scale range in shale images, and finally draw a particle size distribution histogram of granular minerals, and achieve particle size statistics of granular minerals of the marine shale of the Longmaxi Formation in Changning area (FIG. 5).

The results show that, taking the three mineral types (quartz, feldspar, carbonate rock mineral) in the Longmaxi Formation shale in Changning area statistically analyzed in this embodiment as an example, it is found that the granular minerals of shale have particle sizes distributed at the μm-nm scales, the mineral particle size distribution histogram shows that the particle size distributions of the three types of particle minerals have certain differences. Based on this, full-scale statistics and characterization of the particle sizes of the particle minerals in the Longmaxi Formation shale can be carried out, for example, the particle sizes of the carbonate rock mineral are concentrated in 20-25 μm, the particle sizes of the quartz are concentrated in 35-65 μm, the particle sizes of the feldspar are concentrated in 50-65 μm, etc. Finally, based on the particle size distribution characteristics of different types of granular minerals and combinations of different types of granular minerals, we further studied the depositional environment and the changes in its depositional hydrodynamic condition of the Longmaxi Formation shale in the Changning area.

To sum up, in the particle size statistical method of granular minerals of shale, shale samples are collected from cores and outcrops in different areas, thin sections preparation and argon ion polishing are performed, and then they are placed under a field emission scanning electron microscopy for observation, the images that can be used to determine the mineral components of the samples are obtained. There is no limit to the number of images of the same sample, but the image field of all components of the sample should be included, and images of the same field of view should not be lost or repeatedly counted. Adobe Photoshop or other alternative image processing software is used to seamlessly splice the collected images, and the adjacent splicing principle is adopted to splice all areas of the sample into a complete picture; the mineral type is determined based on the EDS energy spectrum analysis data; ImageJ image analysis software is utilized to perform background subtraction on the grayscale distribution of the type of shale mineral particles specifically determined in the images from the field emission scanning electron microscopy, thus achieving the marking of single mineral type; the classification of granular minerals in shale (for example feldspar, quartz, carbonate mineral, etc.) is achieved by setting a reasonable grayscale threshold value; reference values are set based on the image information, and the Analyze Particles command is used to statistically analyze and measure the particle sizes of the minerals in the target area; based on the statistical data results, the extraction and calculation of the particle sizes of minerals in a μm-nm scale range in the shale images are finally realized, and the characterization of particle size distribution of grain minerals of shale is finally realized.

Finally, it should be noted that the above embodiments are only used to illustrate the technical solutions of the present disclosure, but not to limit the present disclosure. Although the present disclosure has been described in detail with reference to the foregoing embodiments, those of ordinary skill in the art should understand that modifications can still be made to the technical solutions described in the foregoing embodiments, or equivalent substitutions can be made to some of the technical features. However, these modifications or substitutions do not cause the essence of the corresponding technical solutions to deviate from the spirit and scope of the technical solutions of the embodiments of the present disclosure.

What is claimed is:

1. A particle size statistical method of granular minerals of shale, comprising:

step 1: collecting shale samples from cores or outcrops;

step 2: cutting the collected samples into 1 cm×1 cm×1 cm of particles;

step 3: performing argon ion polishing on the cut samples, then placing the samples under a field emission scanning electron microscopy for observation;

step 4: magnifying the samples by the field emission scanning electron microscopy to an appropriate magnification until mineral particles are clear, then observing the cut samples, collecting 500-1000 images at the same scale;

step 5: using Adobe Photoshop image processing software to seamlessly splice the collected images, splicing adjacent images into one image, completing image splicing of multiple areas in sequence, and finally splicing all areas of the sample into one complete picture;

step 6: marking mineral particles from the complete picture using ImageJ image analysis software and using Energy-Dispersive Spectroscopy (EDS) energy spectrum analysis to determine the mineral types of the marked mineral particles in the shale;

step 7: using ImageJ image analysis software to perform background subtraction on the marked mineral types of shale mineral particles determined based on the EDS energy spectrum so that the images become binary images with only black highlighted shale mineral particles on a white background;

step 8: marking the mineral particle types to be measured in sequence, then identifying edges of granular minerals through automatic scanning and manual tracking, and statistically analyzing and measuring particle sizes of minerals in a target area, and finally realizing extraction and calculation of particle sizes of minerals in a μm scale range in the binary images, and drawing a particle size distribution histogram of granular minerals.

* * * * *